United States Patent Office 3,580,957
Patented May 25, 1971

3,580,957
PREPARATION OF TETRAFLUOROETHYLENE ETHYLENES
Herman S. Bloch, Skokie, Ill., assignor to Universal Oil Products Company, Des Plaines, Ill.
No Drawing. Filed Aug. 6, 1969, Ser. No. 848,104
Int. Cl. C07c 21/18
U.S. Cl. 260—653.5                10 Claims

ABSTRACT OF THE DISCLOSURE

Tetrahalo-substituted ethylenes in which all of the halo substituents are identical halogens may be prepared by treating a mixed hexahalo ethane in which at least four of the halogen substituents are identical with a free radical generating catalyst at elevated temperatures in the presence of a hydrocarbon solvent. The tetrahalo-substituted ethylenes are useful as starting materials for the preparation of polymeric substances.

---

This invention relates to a process for preparing tetrahalo ethylenes. More specifically, the invention is concerned with a process for preparing tetrahalo-substituted ethylenes by utilizing a hexahalo-substituted ethane, said halo substituents being of a dissimilar nature but containing two fluorine atoms on each carbon atom as the starting material. The latter may be formulated as $$XF_2C=CF_2Y$$

where X and Y may be independently chosen from the halogens other than fluorine.

Tetrahalo-substituted ethylenes, and more specifically, tetrafluoroethylene may be utilized as starting materials in the preparation of polymeric substances. A specific example of this is the preparation of polymers known in the trade as Teflon. The resultant polymers will find a wide variety of uses in commercial applications. For example, the polymer may be prepared as a thin coating for cooking utensils such as frying pans or pots whereby the problem of food adhering to the surface of the cooking utensil is eliminated. In addition, the tetrafluoroethylene which may be in the form of a polymer, plastic, or resin, is available as resin powder or may be formed into sheets, rods, tape, and as an aqueous dispersion or film. The various forms of the compound, in addition to its use as a coating for cooking utensils where stickiness must be avoided, may also be used as gaskets, seals, components for electrical insulation, linings for drums and containers, valve seats, bearings and packings, as a spacer for coaxial cables, laminates, diaphragms, molded parts of pumps and fittings, tubes or hoses, etc. The various uses of tetrafluoroethylene are due to the physical properties of the compound such as being non-flammable as well as being highly resistant to oxidation and the action of chemicals which include strong acids, alkalis, and oxidizing agents.

It is therefore an object of this invention to provide a novel process for prearing tetrahalo-substituted ethylenes in which the halogen substituents are identical in nature.

In one aspect an embodiment of this invention is found in a process for the preparation of a tetrahalo-substituted ethylene which comprises reacting a mixed hexahalo-substituted ethane containing two fluorine atoms on each carbon atom with a free radical generating compound at an elevated temperature at least as high as the decomposition temperature of said compound in the presence of a hydrocarbon solvent, and recovering the resultant tetrafluoro-substituted ethylene.

A specific embodiment of this invention is found in the process of the preparation of a tetrahalo-substituted ethylene which comprises reacting 1,2-dichlorotetrafluoroethane with benzoyl peroxide at a temperature in the range of from about 50° to about 300° C. in the presence of n-pentane, and recovering the resultant tetrafluoroethylene.

Other objects and embodiments will be found in the following further detailed description of the present invention.

As hereinbefore set forth the present invention is concerned with a process for preparing tetrahalo-substituted ethylenes in which the halogen substituents are identical in nature. The process is effected by treating a hexahalo-substituted ethane in which two of the halogen substituents may be dissimilar in nature from the other four, for example, 1,2-dichlorotetrafluoroethane which may be prepared by the flourination of 1,2-dichloroethane or by the addition of fluorine to 1,2-dichloroacetylene by any means known in the art; or the hexahaloethanes formed by fluorinating the corresponding 1,2-dibromo or diiodo compounds. In the present process, such compounds are treated with a free radical generating compound or catalyst at an elevated temperature.

The free radical generating compounds or catalysts which may be used in the present process are those which are capable of forming free radicals under the reaction conditions which are utilized in this process. These include peroxy compounds, containing the bivalent radical —O—O— which is capable of inducing the transfer of the halogen substituents, dissimilar in nature from the fluorine, from the ethane molecule. The organic peroxy compounds constitute a preferred class of catalysts for use in this invention and include peracetic acid, persuccinic acid, dimethyl peroxide, diethyl peroxide, dipropyl peroxide, di-t-butyl peroxide, butyryl peroxide, lauroyl peroxide, benzoyl peroxide, tetrahydronaphthalene peroxide, urea peroxide, t-butyl perbenzoate, t-butyl hydroperoxide, methylcyclohexyl hydroperoxide, cyclohexanone peroxide, cumene hydroperoxide, etc. It is also contemplated within the scope of this invention that organic peroxy compounds which are compounded commercially with various diluents for use as free radical generating agents may be used and include benzoyl peroxide compounded with calcium sulfate, benzoyl peroxide compounded with camphor, etc. Only catalytic amounts (less than stoichiometric amounts) are needed.

The reaction of the present process involving the aforementioned starting materials is effected at elevated reaction temperatures which should be at least as high as the initial decomposition temperature of the free radical generating catalyst, such as the peroxide compound, in order to liberate and form free radicals which promote the reaction. In selecting a particular reaction temperature for use in the process of the present invention, two considerations must be taken into account. First, sufficient energy by means of heat must be supplied to the reaction system so that the reactants, namely, the peroxide and the polyhalogenated hydrocarbon, will be activated sufficiently for radical transfer to take place when free radicals are generated by the catalyst. Second, free radical generating catalysts such as peroxy compounds, particularly organic peroxides, decompose at a measurable rate with time in a logarithmic function dependent upon temperature. This rate of decomposition can be and ordinarily is expressed as the half life of a peroxide at a particular temperature. For example, the half life in hours for di-t-butyl peroxide is 17.5 hours at 125° C., 5.3 hours at 135° C., and 1.7 hours at 145° C. (calculated from data for the first 33% decomposition). A reaction system temperature must then be selected so that the free radical generating catalyst decomposes smoothly with the generation of free radicals at a half life which is not too long. In other words, sufficient free radicals must be present to induce the present chain reaction to take place, and these radicals must be formed at a temperature at which the reactants are in a suitably activated state for conversion. When the half life of the free radical generating catalyst is greater than 10 hours, radicals are not generated at a sufficient rate to cause the reaction to go forward at a detectable rate. Thus, the reaction temperature may be within the range of from about 50° to about 300° C. and at least as high as the decomposition temperature of the catalyst, by which is meant a temperature such that the half life of the free radical generating catalyst is not greater than 10 hours. Since the half life for each free radical generating catalyst is different at different temperatures, the exact temperature to be utilized in a particular reaction will vary. However, persons skilled in the art are well acquainted with the half life vs. temperature data for different free radical generating catalysts and thus, it is within the skill of one familiar with the art to select the particular temperature needed for any particular catalyst. However, the operating temperatures generally do not exceed the decomposition temperature of the catalyst by more than about 150° C. For example, when a free radical generating catalyst such as t-butyl perbenzoate is used having a decomposition temperature of approximately 115° C., the operating temperature of the process is from about 115° to about 265° C. When di-t-butyl peroxide having a decomposition temperature of about 130° C. is used, the process is run at a temperature ranging from about 130 to about 280° C. Higher reaction temperatures may be employed, but little advantage is gained if the temperature is more than the hereinbefore mentioned 150° C. higher than the decomposition temperature of the catalyst.

In addition to the elevated temperatures which are utilized, the reaction may also be effected at elevated pressures ranging from about 1 to about 100 atmospheres or more, the preferred operating pressure of the process being that which is required to maintain a substantial portion of the reactants in liquid phase. Pressure is not an important variable in the process of this invention. However, because of the low boiling points of some of the reactants, it is necessary to utilize pressure-withstanding equipment to insure liquid phase conditions. In batch type operations it is often desirable to utilize pressure-withstanding equipment, to charge the reactants and catalyst to the vessel, and to pressure the vessel with 10, 30, 50 or more atmospheres with an inert gas such as nitrogen. This helps to insure the presence of liquid phase conditions. However, when the molar quantity of reactants (including the solvent) is sufficient, the pressure which they themselves generate at the temperature utilized is sufficient to maintain the desired phase conditions.

The concentration of the catalyst employed in this process may vary over a rather wide range but it is desirable to utilize low concentrations of catalysts such as from about 0.1 to about 10% of the total weight of the combined starting materials charged to the process. The reaction time may be within the range of from less than one minute to several hours depending upon the temperature and half life of the free radical generating catalyst. Generally speaking, contact times of at least 10 minutes are preferred.

In addition, the reaction is effected in the presence of a hydrocarbon solvent. This solvent may be paraffinic or aromatic in nature, specific examples of these solvents including paraffins such as n-pentane, n-hexane, n-heptane, etc., cycloparaffins such as cyclopentane, methylcyclopentane, cyclohexane, methylcyclohexane, cycloheptane, methylcycloheptane, etc. and aromatics such as benzene, toluene, o-xylene, m-xylene, p-xylene, ethylbenzene, etc.

The process of this invention may be effected in any suitable manner and may comprise either a batch or continuous type operation. For example, when a batch type operation is used, a quantity of the hexahalo-substituted ethane such as 1,2-dichlorotetrafluoroethane which has been obtained by fluorination of 1,2-dichloroethane or by fluorination of 1,2-dichloroacetylene is charged to a rotating autoclave which contains a catalytic amount of the organic peroxy compound and the hydrocarbon solvent. In the event that temperatures higher than those normally used are to be employed to effect the process of this invention, the desired pressure which is required to maintain a major portion of the reactants in liquid form is produced by the introduction of the inert gas such as nitrogen into the vessel and the apparatus is thereafter heated to the desired operating temperature which, as hereinbefore set forth, ranges from a temperature at least as high as the decomposition temperature of the catalyst up to a temperature of approximately 150° C. higher than said decomposition temperature. Upon completion of the desired residence time, the apparatus and contents thereof are allowed to cool to room temperature. The desired tetrafluoroethylene which is in gaseous form is recovered from the reactor by venting the reactor into a desired recovery vessel.

It is also contemplated within the scope of this invention that the process of the present invention may be effected by a continuous type operation. When this type of operation is used, the hexahalo-substituted ethane is continuously charged to a reaction zone which is maintained at the proper operating conditions of temperature and pressure, said reaction zone containing the organic peroxy catalyst and the hydrocarbon solvent. If so desired the hydrocarbon solvent may be charged to the reaction vessel through a separate line or the hexahalo-substituted ethane may be dissolved in the hydrocarbon solvent and the combination charged thereto in a single stream. The organic peroxy catalyst may be charged into the reaction zone through a separate line in a catalytic amount dissolved in the solvent or hexahalo-substituted ethane, or may be included in a single stream with these if so desired. After a desired resident time has elapsed the reactor effluent is continuously withdrawn and the gas phase separated from the liquid phase. The gas phase, which contains the desired tetrahalo-substituted ethylene, and specifically, tetrafluoroethylene, along with a hydrogen halide, is separated from the latter and from unreacted starting materials by conventional means (such as water scrubbing to remove hydrogen halide), the unreacted starting materials then being recycled to form a portion of the feed stock while the desired product is recovered and removed to storage.

The following examples are given to illustrate the process of the present invention which, however, are not intended to limit the generally broad scope of the present invention in strict accordance therewith.

EXAMPLE I

In this example 5 grams (0.02 m.) of benzoyl peroxide and 100 cc. of n-pentane are placed in the glass liner of a rotating autoclave. The liner is sealed in the autoclave and 2 moles of 1,2-dichlorotetrafluoroethane are charged to the autoclave. The autoclave is then heated to a temperature of 110° C. and is maintained thereat for a period of about 4 hours. At the end of this time heating is discontinued and the autoclave and contents thereof are allowed to cool to room temperature. The reaction mixture is recovered and the gas phase is separated from the liquid phase, the former comprising tetrafluoroethylene, being water-washed, recovered, and removed to storage.

EXAMPLE II

In this example 3 grams (0.02 m.) of di-t-butyl peroxide and 100 cc. of benzene are placed in the glass liner of a rotating autoclave and 1,2-dichlorotetrafluoroethane is charged thereto until 2.0 moles of the gas has entered the reactor. The autoclave is then heated to a temperature of 130° C. and maintained in a range of from 130 to about 150° C. for a period of about 8 hours. At the end of this time the autoclave and contents thereof are allowed to return to room temperature and the reaction product is recovered. The gas phase is separated from the liquid and the desired tetrafluoroethylene is recovered.

EXAMPLE III

In like manner 0.02 mole of acetyl peroxide along with 100 cc. of benzene is placed in the glass liner of a rotating autoclave. The liner is sealed into the autoclave and 2.0 moles of 1,2-dibromotetrafluoroethane is charged thereto. The autoclave is then heated to a temperature of about 100° C. and maintained thereat for a period of about 8 hours. At the end of this time heating is discontinued and the reaction mixture along with the autoclave is allowed to return to room temperature. The reaction product is recovered upon opening the autoclave and the gas phase is separated from the liquid phase, the desired product comprising tetrafluoroethylene being recovered from said gas phase.

I claim as my invention:

1. A process for the preparation of a tetrafluoro-substituted ethylene which comprises reacting a mixed hexahalo-substituted ethane containing two fluorine atoms on each carbon atom with a free radical generating compound at an elevated temperature at least as high as the decomposition temperature of said compound in the presence of a hydrocarbon solvent, and recovering the resultant tetrafluoro-substituted ethylene.

2. The process as set forth in claim 1 in which said temperature is in a range of from about 50° to about 300° C.

3. The process as set forth in claim 1 in which said free radical generating compound is di-t-butyl peroxide.

4. The process as set forth in claim 1 in which said free radical generating compound is benzoyl peroxide.

5. The process as set forth in claim 1 in which said free radical generating compound is acetyl peroxide.

6. The process as set forth in claim 1 in which said free radical generating compound is t-butyl hydroperoxide.

7. The process as set forth in claim 1 in which said hydrocarbon solvent is n-pentane.

8. The process as set forth in claim 1 in which said hydrocarbon solvent is benzene.

9. The process as set forth in claim 1 in which said mixed hexahalo-substituted ethane is 1,2-dichlorotetrafluoroethane.

10. The process as set forth in claim 1 in which said mixed hexahalo-substituted ethane is 1,2-dibromotetrafluoroethane.

References Cited

UNITED STATES PATENTS

| | | | |
|---|---|---|---|
| 2,401,897 | 6/1946 | Benning et al. | 260—653.3 |
| 3,016,407 | 1/1962 | Brace | 260—653.5 |
| 3,187,056 | 6/1965 | Tatlow et al. | 260—653.5 |

OTHER REFERENCES

Roberts et al., J. Phys. Chem. 69 (11), 2446–2450 (1963).

DANIEL D. HORWITZ, Primary Examiner